(12) United States Patent
Ibarra

(10) Patent No.: US 10,985,984 B1
(45) Date of Patent: Apr. 20, 2021

(54) SYSTEMS AND METHODS FOR UPGRADING SCRIPTS ON LOW POWER DEVICES

(71) Applicant: SYNAPSE WIRELESS, INC., Huntsville, AL (US)

(72) Inventor: Eric Joseph Ibarra, Madison, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 130 days.

(21) Appl. No.: 16/111,463

(22) Filed: Aug. 24, 2018

(51) Int. Cl.
| | |
|---|---|
| *H04L 7/02* | (2006.01) |
| *G06F 16/27* | (2019.01) |
| *H04L 12/24* | (2006.01) |
| *G06F 8/656* | (2018.01) |
| *G06K 19/07* | (2006.01) |

(52) U.S. Cl.
CPC ............ *H04L 41/082* (2013.01); *G06F 8/656* (2018.02); *G06K 19/0705* (2013.01); *G06K 19/0712* (2013.01); *G06K 19/0715* (2013.01)

(58) Field of Classification Search
CPC ... H04L 41/082; G06F 8/656; G06K 19/0705; G06K 19/0712; G06K 19/0715
See application file for complete search history.

(56) References Cited

U.S. PATENT DOCUMENTS

| 8,438,250 B2 | 5/2013 | Ewing |
| 2001/0029178 A1 | 10/2001 | Criss et al. |
| 2010/0267407 A1* | 10/2010 | Liao ................... H04W 52/0216 455/509 |
| 2014/0062671 A1* | 3/2014 | Gudan ............... G06K 19/0715 340/10.33 |
| 2014/0169340 A1* | 6/2014 | Gupta ..................... H04W 4/70 370/336 |
| 2015/0012761 A1* | 1/2015 | Li ...................... H04W 52/0235 713/310 |
| 2016/0073343 A1* | 3/2016 | Szewczyk ........... H04L 12/1863 370/311 |

* cited by examiner

*Primary Examiner* — Nicholas R Taylor
*Assistant Examiner* — Sanjoy Roy
(74) *Attorney, Agent, or Firm* — Maynard Cooper & Gale, P.C.; Jon E. Holland

(57) ABSTRACT

A mobile device connected to a wireless sensor network may receive a script update in a series of transmissions from a network management device, the transmissions being broken up over an extended period of time. The transmissions may be as small as one or several packets that make up a portion of the script. Each transmission is sent and received in coordination with a predetermined active cycle of the mobile device, i.e., during the normal mode of operation for the mobile device. A device may transition from a low-power (sleep) state to an active (awake) state to perform its routine functions. During this active time, a network management device sends a message to the mobile device indicating the availability of a script update. The mobile device, in response, transmits to the network management device a requested amount of update data it wishes to receive during this period of activity. Once the requested amount of update data has been received, the mobile device returns to a low-power state, during which it receives no additional data transmissions.

10 Claims, 4 Drawing Sheets

SYSTEMS AND METHODS FOR UPGRADING SCRIPTS ON LOW POWER DEVICES

RELATED ART

Complex installations of wireless network-enabled devices in industrial, commercial, and residential applications may require varied network management solutions to optimize performance of different device nodes. In one example, some devices (such as sensors, periodic monitoring devices, or mobile devices, among others) may function as low-power devices, where the devices do not constantly function in an active state. In an asset tracking system, for instance, a plurality of network nodes can be used to track an asset (e.g., an item or an individual) through a facility by use of a tag that is attached or carried. This mobile tag may have the sole function of communicating with network nodes to determine the location of the associated asset, and as such, the tag may not normally function so as to be continuously active or awake. Power supply may be limited on such types of devices, particularly those running on a current-limited source such as a solar panel or a low capacity battery. The modern trend towards developing smaller devices (and smaller batteries for those devices) may also contribute to power constraints in these devices.

While low power implementations of networked devices are particularly important to the efficiency of a complex wireless network, challenges may arise in the management of the software installed on these devices. It may be the case that the software on these devices must be updated from a remote network management source, such as a gateway device. Low-power devices may experience periods of unavailability and ineffective power consumption during software updates. In particular, a low-power device may be kept in an active state for a long period of time to query the remote server to see if an update is available, receive the software update (which may be large in size), and install the update. If the update is particularly large, or if network connectivity is unreliable, the transmission of the update may take a very long time. This transmission time, plus the time for installation of the update, may last so long that the low-power device is unable to perform its scheduled task(s) at its designated interval. If the information or function provided by the low-power device is system-critical and/or other functionalities of the network depend therefrom, downtime of the low-energy device could lead to escalating or debilitating problems occurring over the network.

Moreover, there may be circumstances where a low-power device is unable to remain in an active state long enough to receive a software update. These power constraints limit the windows of time available and/or the resources necessary for large software updates. In such circumstances, it may be difficult or impractical to provide updated software to the device via a wireless network. In some cases, administrators may attempt to perform a software update by physically accessing the low-power device and providing sufficient power to the device from an external source during the update. However, physically accessing a large number of devices in such manner can be burdensome and time consuming.

Accordingly, further techniques for distributing software updates to low-power devices are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
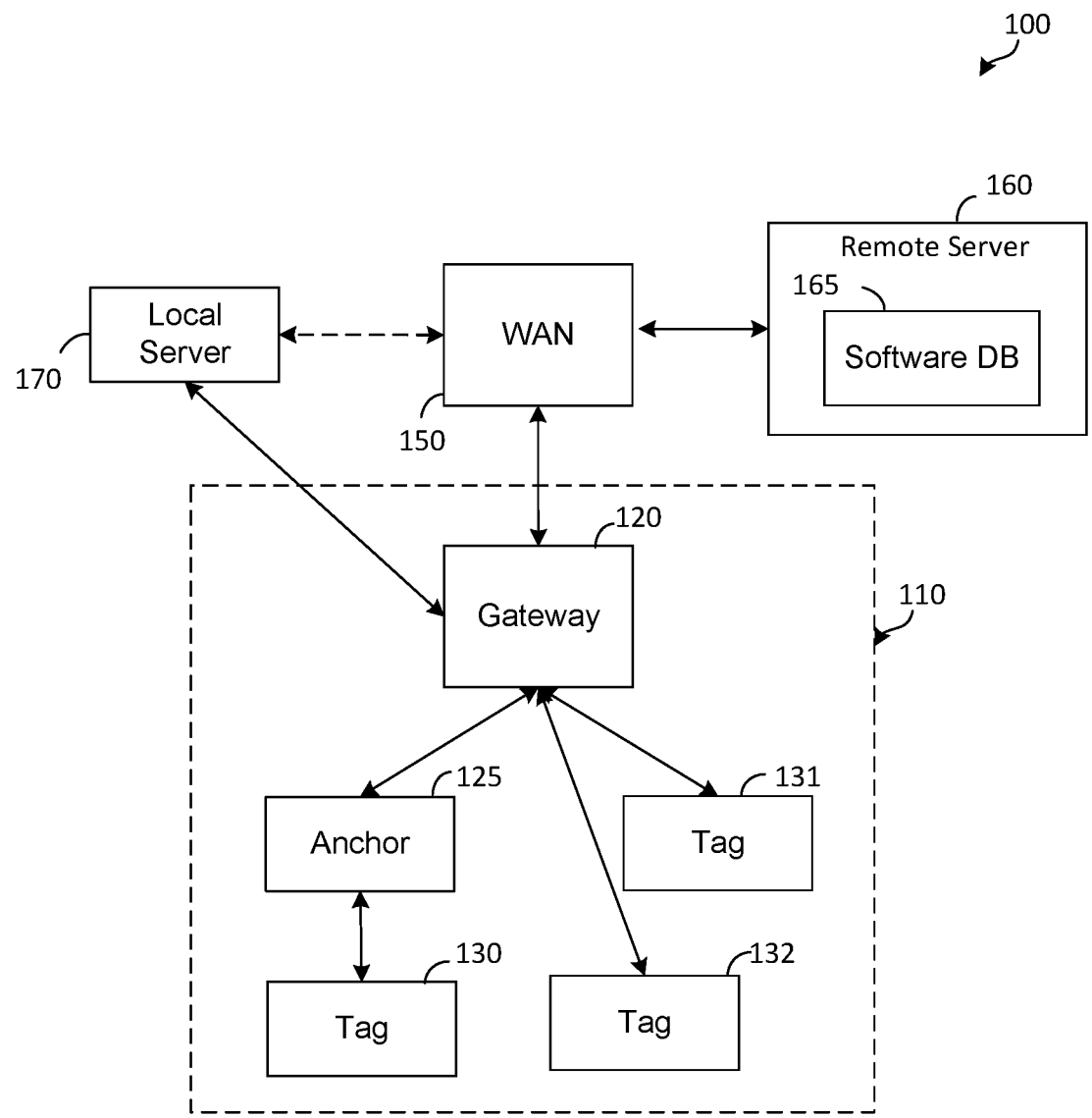
FIG. 1 is a block diagram illustrating an exemplary embodiment of a wireless network in accordance with the present disclosure.

The present disclosure generally pertains to the distribution of software updates to low-power networked devices. In an exemplary embodiment, the systems and methods described herein are generally directed to asset tracking systems, wherein network devices can be used to track an asset (e.g., an item or an individual) through a facility, for example by use of a tag that is attached or carried. It will be generally understood that an "asset" as used in the description of the various embodiments described in this disclosure refers to a wide variety of equipment, used in industrial, commercial, manufacturing, healthcare, and residential applications, among others.

In one embodiment, a device wakes up (transitions from a low-power state to an active state) at a routine interval, performs its set task(s) (e.g., checking a sensor value and reporting the same to a remote server, or reporting a location to the server) and, upon completion of its set task(s), queries a remote network management device (e.g., a gateway) to determine whether an updated script for the device is available. If an update is available, the network management device will respond to the device with a confirmation of availability, based on which the device will remain in an active state. The network management device then transmits to the device one or a few packets, the payload of which make up a portion of the script. The device, after receiving the portion, stores the packet(s) and returns to a low-power state, during which it does not receive any additional data transmission from the gateway. Upon waking up for a second time, at a routine interval, and performing its set task(s), the device once against queries the remote network management device to inquire about the availability of updated software. The remote network management device, in response, sends a second portion of the script (e.g., one or a few packets) that is immediately subsequent to and contiguous with that of the packets making up the first portion of the software. The device then once again returns to a low-power state. This process repeats each time the device returns to an active state, each time receiving a different portion of the software, until, after multiple cycles, the device has received the entirety of the transmission and can install or execute the received software.

In an alternate embodiment, rather than the device sending a query to the gateway about the availability of an update, the gateway is instead configured to recognize other types of network traffic sent by the device over the network to determine that the device is in an active state (awake). The gateway then uses that determination as a trigger to send a message to the device about the availability of updated software.

In some embodiments, the device is capable of dynamically determining the size and/or duration of the transmission it wishes to receive during its active timeframe. As an example, based on the scheduled functions the device needs to perform, the device's available uptime, and/or other factors that may impact the power consumption of the device, the device may be able to determine a window in which it is able to receive transmission, or a certain number of packets it is able to receive.

In this manner, the device receives the entirety of the transmitted script in small parcels over an extended period of time, rather than at once in a single transfer of several or many packets. If the device were to receive the script in one large transmission, the device must remain awake in a single sitting throughout the receipt of the entirety of the transmission, any error checking, and, in some circumstances, the execution of the script. By instead receiving the packets in a spaced-out series of transmissions, the device can avoid the need to remain in an active state for an extended period of time, and may thereby avoid continuous power usage during that time.

In addition, if the device must remain engaged in the receipt of new script (i.e., listening for and processing transmitted data) and in the installation thereof, the device is not at that time able to use its resources for its normal operation. Put another way, when a sensor device is engaged with waiting to receive a large number of packets containing the totality of a script, the sensor may be incapable of taking its required readings, e.g., transmitting the value of a sensor located at the tag of the networked device. The present embodiment allows for the routine operation of the device to occur on its normal schedule (or close to its norm), giving transmission of the script a second priority to the expected functions of the device. As a result, because the device accomplishes its tasks before or as it receives the script packets, the device's battery usage during the period of receiving the software is more efficient, and average current consumption of the device, which likely has a current-limited source, can be reduced.

FIG. 1 depicts an exemplary embodiment of a system 100 for distributing software updates to asset devices. As shown by FIG. 1, the system 100 comprises a wireless sensor network (WSN) 110 made up of a plurality of nodes. A stationary node 125 (which shall be referred to hereafter as an "anchor") is shown. An anchor may be positioned at a specific location within a facility, such as a commercial building or warehouse. In an exemplary embodiment, an anchor may be mounted or otherwise positioned at a particular location. Three mobile nodes 130, 131, and 132 (also referred to in an asset tracking system as "tags") are also shown in FIG. 1, which mobile nodes communicate to any network management devices via RF transmission, e.g., between each other and other networked devices, and/or via an anchor node, as described in greater detail below. For simplicity of illustration, in the embodiment of FIG. 1, tag 130 is associated with anchor 125 in a 1:1 relationship. However, in many WSNs, it is preferable to have tags that are not associated with an anchor (such as tags 131 and 132), or alternatively, to have one anchor communicating with several tags in a one-to-many relationship. This is particularly true in a network that relies upon multicast messaging, as in a preferred embodiment. However, other network configurations are also possible. For example, in some embodiments, a 1:1 relationship between anchors and tags may be implemented in order to reduce the traffic communicated to and from the tag across the network 110, and to reduce interference between transmissions. Alternatively, multiple tags may be assigned to an anchor.

In some embodiments, any combination of stationary or mobile nodes may be used, and any number of nodes may exist. In an exemplary embodiment, the WSN 110 is implemented as a mesh network, but other types of networks may be implemented in other embodiments.

System 100 includes a gateway 120 which connects a plurality of devices such as servers, computers, terminals, wireless devices (also referred to herein as "nodes"), sensors, and/or network management devices, all of which function collectively as a network. For illustrative purposes, with reference to FIG. 1, it can be assumed that any of the components of the system 100 are within range of and capable of wireless communication with any device or component connected to it (either directly or indirectly) by the depicted lines. However, it will be noted that in addition to, or as an alternative to, wireless communication, any or all of the components of the system 100 may be coupled to another component through a physical medium. In one embodiment, the nodes of the system 100 are designed to communicate through multicast messages, to reduce network congestion, however, it will be understood that alternate methods of transmitting message, such as unicast transmission through reference to routing tables, may be used as appropriate.

In one exemplary embodiment, the WSN 110 is coupled to a WAN 150, such as the Internet or other known communication network, via the gateway 120. In one exemplary embodiment, transmission control protocol/Internet protocol (TCP/IP) is used for such communication through the WAN, but other protocols and network types are possible in other embodiments. The WAN 150 is coupled to a remote server 160 with a software database 165. The remote server may be managed, for example, by a network administrator, or in one embodiment, by a third party software provider. The software database 165 stores scripts to be pushed to the devices on WSN 110. It will be noted that while the term "script" (or "software", "code," or "program") is used herein, the data to be pushed to the networked devices may take any appropriate form. For example, the data to be pushed may take the form of a script or any other type of interpretable or executable set of instructions. Alternately, the data need not be code at all, but could take the form of, among other things, software libraries, related non-executable data, documentation, media, or any other appropriate data in support of the functioning of the network device. In one embodiment, the software database 165 may also store information associating each device on the WSN 110 with a software update status, however, such information may alternately (or additionally) stored at the gateway 120 or at another network device.

The system 100 also includes a local server 170. In a preferred embodiment, the local server 170 is located relatively close to the WSN 110, such that communication may take place directly between the local server 170 and the gateway 120, thereby reducing the time needed for and the reliability of communication between the local server 42 and the anchor 125 and nodes 130-132. However, in other embodiments, the local server 170 may be a server that is coupled to, and communicates with WSN 110 via, the WAN 150 (illustrated in FIG. 1 by a dotted line between the local server 170 and the WAN 150). The local server 170 can be provisioned to know the network configuration, including, e.g., the network address and/or identifiers of the nodes 130-132 and other networked components. In some embodiments, the local server 170 may store a variety of information collected by the nodes 130-132, for example, data collected by sensors in tags 130-132, or location information of the tags 130-132 (described in greater detail below).

As described above with reference to FIG. 1, the system 100 comprises mobile nodes 130-132 (tags) capable of wireless communication with the anchor 125 and/or other networked devices as the tags are moved through the facility. In one exemplary embodiment, the tags 130-132 are attached to assets (e.g., a person or object), typically on a 1:1 basis, so as to track movements of the asset by sending location information over the WSN 110. In other embodiments, in addition to, or in place of, sending data tracking movement of the asset, the tags 130-132 may also provide other types of data. As one example, in circumstances where the tags contain one or more sensors to measure environmental, operational, or situational conditions (such as, e.g., sensors to measure temperature, heat, humidity, power readings, or movement data, among many other things), the tag may be configured to send data associated with its sensors' readings through the WSN 110 (in some cases via an anchor) to the local server 170 or other appropriate networked device, via gateway 120.

The tags 130-132 are nodes of the WSN 110, but are not (in the preferred embodiment) configured to route messages through the WSN 110. That is, a tag 130 may transmit a network message to a corresponding anchor 125 for communication through the WSN 110. Messages may also be directed through the WSN 110 so as to reach their destination in the tag 130. However, a tag 130 does not serve as an intermediate hop or relay node for messages. Through this practice, the tag 130 may reduce the functions it must perform and the time it needs to be listening for network traffic, thereby conserving the tag's power.

Figure 2:
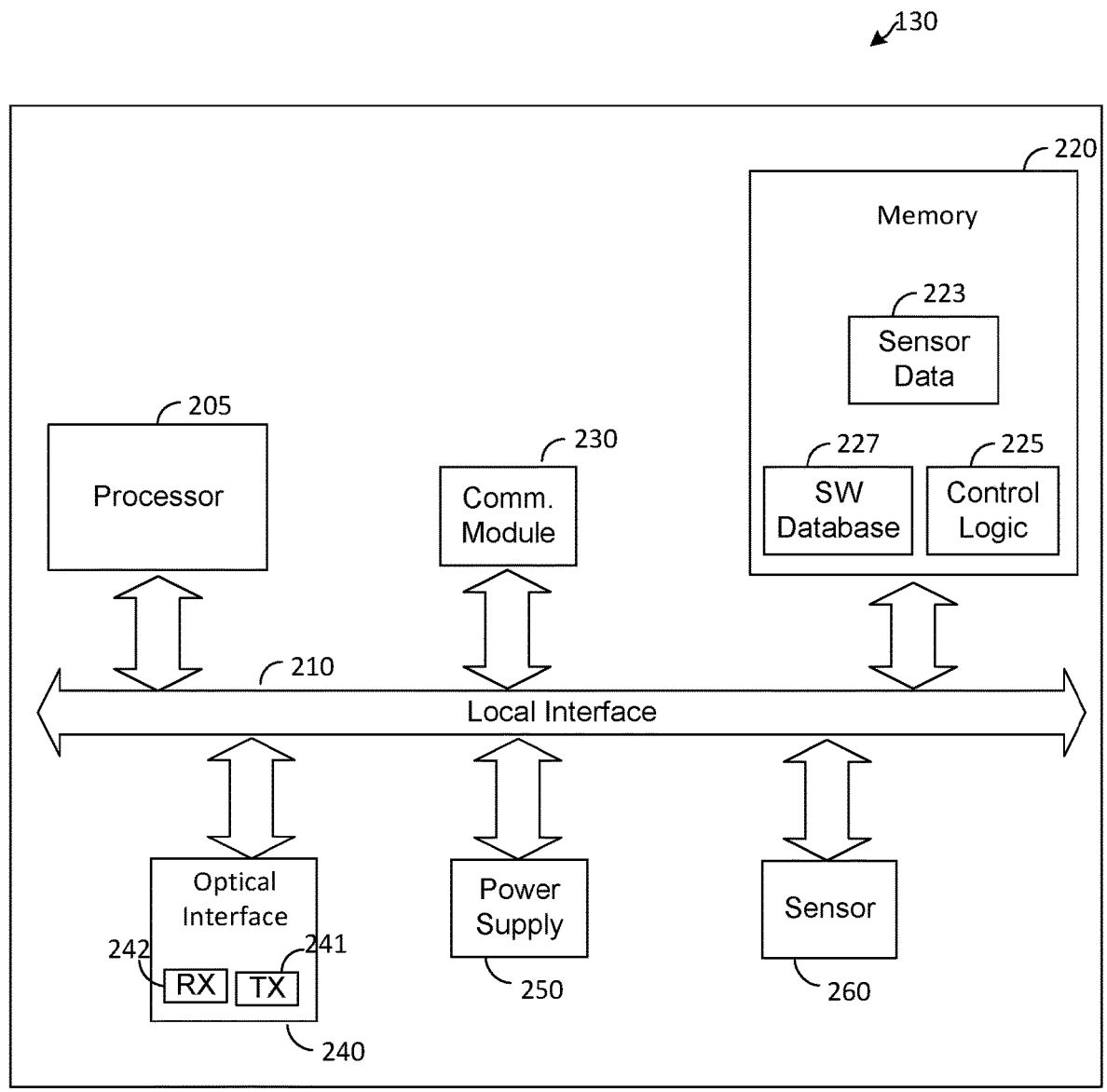
FIG. 2 is a block diagram illustrating an exemplary embodiment of a network node, such as is depicted by FIG. 1.

FIG. 2 depicts a tag 130 in accordance with an exemplary embodiment of the present disclosure. It will be understand that, in a preferred embodiment, other tags, e.g., tags 131 and 132, will have a structure along the lines depicted in FIG. 2, however, other architectures may be possible in other embodiments. The exemplary tag 130 comprises at least one processor 205, such as a central processing unit (CPU), digital signal processor (DSP), other specialized processor or combination of processors, or other circuitry that communicates to and drives the other elements within tag 130 via a local interface 210 (for example, a bus). The tag 130 has control logic 225 for generally controlling the operation of the tag 130. The control logic 225 can be implemented in software, hardware, firmware, or any combination thereof. In the embodiment illustrated in FIG. 2, the control logic 225 is implemented in software and is stored in a memory 220. Control logic 225, when implemented in software, can also be stored on any computer-readable medium, for example electronic, magnetic, or optical mediums, among others, or another system, apparatus, or device. The control logic 225 is implemented by the processor 205 or any other circuitry capable of executing the instructions of the control logic 225.

The exemplary tag 130 has a communication module 230, which comprises an RF radio or other device for communicating wirelessly. As described above, in an exemplary embodiment, communication module 230 enables wireless communication from the tag 130 to the anchor 125, or to devices outside the WSN 110 via the gateway 120 (FIG. 1).

The tag 130 also has a power supply 250, such as one or more batteries, which provide electrical power to the components of the tag 130. In embodiments, the power supply may be another low-power source, such as a solar panel.

In the exemplary embodiment, the tag 130 has a sensor 260. This sensor may take many forms, for example, a magnetic sensor configured to provide a value indicative of a direction (e.g., angle) of the sensor (such as a compass), a motion sensor (such as an accelerometer), a pressure sensor configured to sense atmospheric pressure (such as an altimeter), a temperature sensor configured to measure ambient temperature, a light sensor configured to sense ambient light, or a humidity sensor configured to sense humidity. Other types of sensors may be possible in other embodiments. While only one sensor is illustrated in FIG. 2, it will be understood that the tag 130 may include more than one sensor.

In a preferred embodiment, data indicative of the samples taken by the sensor(s) 260 is transmitted to one or more anchors 125, or other networked device, immediately or soon after the sensor completes its reading. That data is referred to hereinafter as a "tag status message." In another embodiment, the data could be stored in memory 220 as sensor data 223, which may be transmitted at a later time. In some embodiments, the tag 130 may process the sensor data prior to transmitting it, for example, by analyzing the data, or associating it with timestamp information and/or recommendation information as to whether the sensor readings indicate normal conditions. An anchor 125 that receives the data sent by the tag 130 in the form of a tag status message may transmit the data to the gateway 120 through the network 110, via RF transmission, and the gateway 120 may forward such data to the local server 170 via RF transmission, or to a remote server 160 through the WAN 150.

Transmission of the sensor data to the anchor 125 is, in one embodiment, done through the tag's optical interface 240. The optical interface 240 is configured to communicate (transmit or receive) with optical interfaces in a corresponding anchor 125. In one embodiment, the optical interface 240 is configured to communicate infrared signals, but optical signals of other wavelengths may be communicated in other embodiments. The optical interface 240 may comprise an optical transmitter (TX) 241 for transmitting a wireless optical signal (e.g., infrared) and an optical receiver (RX) 242 for receiving an optical signal (e.g., infrared). The optical transmitter 241 is configured to repetitively (e.g., periodically) transmit an infrared signal to the anchor 125. In alternate embodiments, the tag 130 may transmit data to the anchor 125 via RF or other wireless communication.

It will be understood that while the term "sensor data" is used, the information transmitted to the anchor in the tag status message is not limited to information generated by a reading of the sensors. For example, in an embodiment directed to asset tagging, the tag status message may include location information of the tag 130. To this end, in one embodiment, the tag 130 may, upon waking up, communicate with an anchor 125 through the optical interface 240 to receive information about the locations (e.g., rooms) in which the anchors are located. The tag 130 may, from that information, generate information about its own location (for example, based on the strength and direction of the signals from one or more anchors), and this generated location information could be included in the tag status message.

In a preferred embodiment, the memory 220 stores, in addition to the control logic 225 and the sensor data 223, data that the tag 130 receives from a network management device, such as messages sent by the gateway 120. Because the tag 130 cycles between active and inactive states, and may have limitations on its power supply, in a preferred embodiment, the memory 220 takes the form of a flash memory or any other type of solid-state, non-volatile storage that retains data in the absence of a power supply. Alternatively, memory cards, hard disk drives, solid-state drives, disk storage, or any form of rewriteable storage capable of retaining information in a power-off or low-power state can be used. Various other data and code can also be written to or read from memory 220.

In one exemplary embodiment, each component shown by FIG. 2 resides on and is integrated with a printed circuit board (PCB), however, other arrangements of the tag 130 are possible. In general, with respect to the disclosure of FIG. 2, it will be understood that an architecture of the tag 130 that minimizes power consumption is preferred. As one example, the architecture of tag 130 may be designed to minimize the number of read and write operations to the memory 220. However, other architectures can also be used as appropriate, for example, to optimize efficiency of processing at the tag 130.

Figure 3:
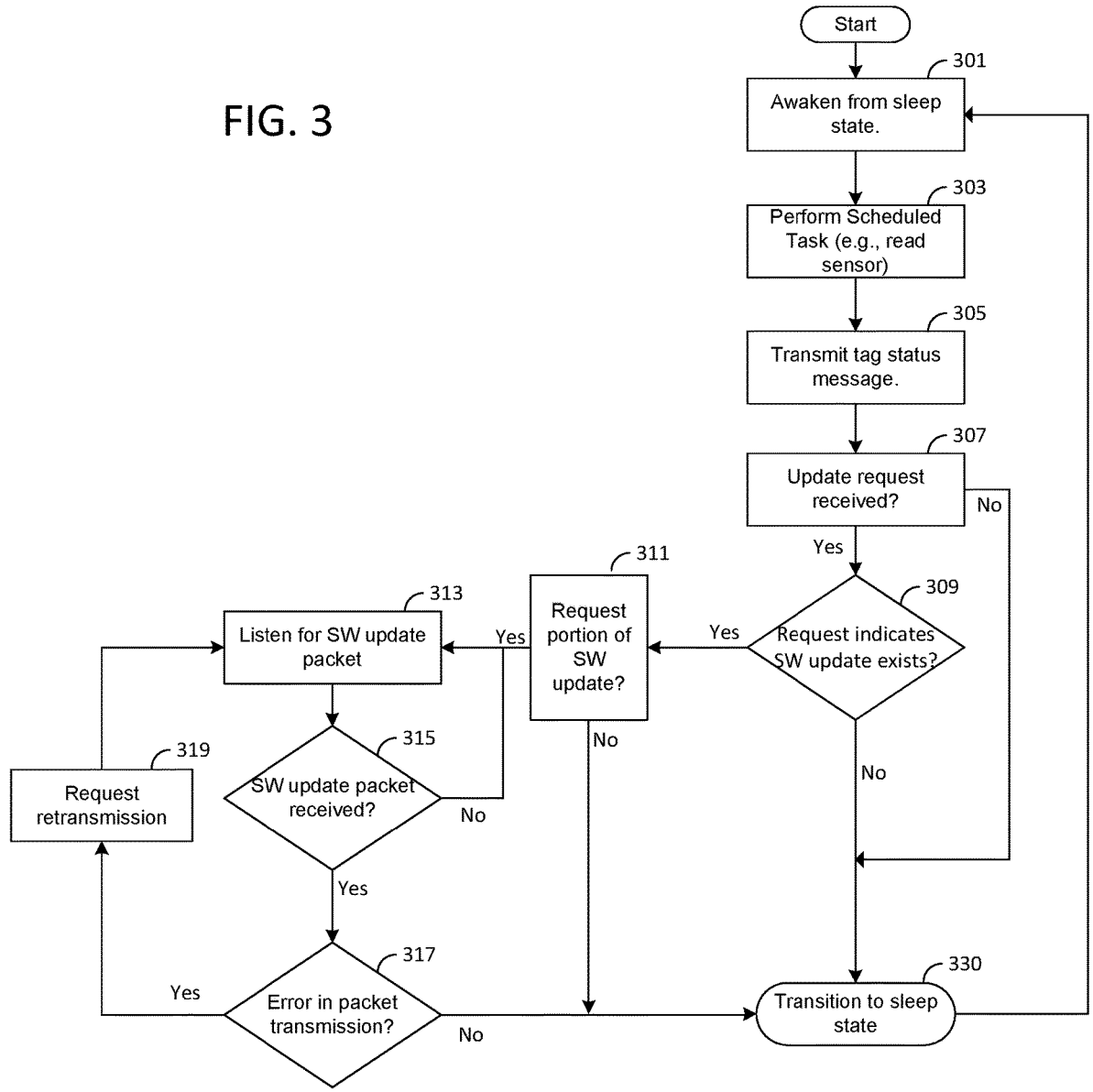
FIG. 3 is a flow chart depicting a process performed by a network node, in accordance with an exemplary embodiment of the present disclosure.

FIG. 3 illustrates a process performed by a tag when receiving an update in accordance with an exemplary embodiment of the present disclosure.

During normal operation, a tag 130 is configured to cycle between a sleep state (also referred to as a "low power" state or "inactive" state) in which components of the tag 130 are deactivated so that the tag 130 consumes less power, and an awake state (also referred to as an "active state" or "wake state"). In particular, in the sleep state, the tag's communication components may be deactivated such that the tag 130 is unable to communicate with external devices.

The exemplary process shown in FIG. 3 begins, at step 301, when a tag 130 cycles to an awake state. In step 303, the tag 130 performs its normal operation, for example, by taking a sensor reading via sensor 260. It will be understood that the routine performed by the tag 130 may involve several tasks and is not limited to the collection of sensor data. Further, the number and/or complexity of processing performed by the tag 130 during its operation may be dependent on, for example, environmental or operational conditions and/or the reading.

Once the tag's scheduled task(s) are completed, the tag 130 is configured to briefly communicate with at least one anchor 125 via a tag status message (step 305). This allows for the tag's location, sensor data, or/and other information to be discovered. This communication is performed in step 305, after the expected functions of the tag 130 have been performed. The tag 130 then listens for a predetermined period of time for an update request from the gateway 120, described in more detail below. If no update request is received before the listening period expires, then the tag 130 cycles into a sleep state (step 330) and the process repeats when the tag 130 transitions back to an awake state, at its normal interval of transition.

In the preferred embodiment illustrated in FIG. 3, the tag status message sent in step 305 may serve as a trigger for the gateway 120 to determine whether a software update is available to send to the tag 130. In particular, the gateway 120 may recognize the awake status of the tag 130 through a monitoring of the tag's communications. For example, when the anchor 125 sends the tag status message to e.g., local server 170 via the gateway 120, the gateway 120 recognizes the source of the tag status message as the tag 130. The gateway 120 can then determine that the tag 130 is at that time in an active state. The gateway 120, knowing that the tag 130 is awake and that an update for the tag 130 is available, may then send a message (also referred to as an update request) to the tag 130, informing the tag to remain awake, in step 307 of FIG. 3. This may take the form of, for example, a bit set to designate whether or not an update exists. Alternatively, the message may contain multiple fields, informing the tag 130 that information to follow is a software update, that the content of the update is contained in the payload of the data to follow, and/or containing instructions to record the content of the packet that follows this message, among other things. In a preferred embodiment, the message contains only a single packet, to ensure receipt of the entire message before the tag 130 begins to transition to a sleep state.

In an alternate embodiment, rather than a monitoring of the tag status message, the update request from the gateway may be triggered via an explicit query from the tag 130. More specifically, the tag 130, before or after sending a tag status update to the anchor 125, may send a query to the gateway 120 as to whether any updates are available that have not yet been installed on the tag 130. This query from the tag 130 to the gateway 120, separate from the tag status message, may then serve as the trigger for the communication from the gateway, e.g., the update request.

When the update request is received by the tag 130, in step 307, the process continues to step 309, in which the update request is analyzed. As described above, the request may contain a positive or negative indication as to the availability of an update for the tag 130 (e.g., a set bit). If no update is available, the tag 130 cycles back into a sleep state (step 330) and the process repeats when the tag 130 transitions back to an awake state, at its normal interval of transition. If an update is available, the tag 130 will be aware that it must remain in an active state rather than transitioning to a sleep state. It will be noted that, in some embodiments, the gateway 120 will not transmit any message if no update is available, and in such a case, the process of FIG. 3 will proceed from step 307 directly to step 330 after the expiration of a period of time.

In addition to notification of a software update, the update request from gateway 120 may also in one embodiment contain information about the update that will allow the tag 130 to make a determination of whether and when it can receive the update at this time, and if so, whether it can only accept a portion of the update. For example, the request may include a listing of the number of packets of data that make up the entirety of the update. In other embodiments, the message may alternatively or additionally include other information, such as the urgency of the update, the time needed for its installation at the tag 130, or the like. In one preferred embodiment, the update request would identify that the available update is a software update for the tag, and would indicate a number of packets to follow, the payloads of which collectively contain the entirety of the update. It will be understood that instead of a list of a total number of packets that comprise the update, the message may also use any data structure to convey information from which the tag 130 can make a determination as to the size of the update.

As part of step 311, the tag 130 determines the duration of transfer and/or the size of the update script to accept. In this regard, the control logic 225 of the tag 130 is configured to interpret the update request sent by the gateway 120 and to make a dynamic determination of how much data the tag 130 can accept at this time. This dynamic determination may be made based on information relevant to the current power consumption and limitations of the tag 130. In one embodiment, the tag may consider the power or time expended during the completion of the tag's routine tasks. As described above with reference to step 305, the tag 130 may consume more power during one period of activity than another (e.g., if a high amount of power is needed for processing or communication). In one scenario, the tag 130 may, during one period of activity, have to use a high amount of current (e.g., to activate a loud buzzer or bright light), but such task may not be routine to its operation. Accordingly, the tag 130 would engage in a dynamic evaluation of the duration or size of data it can receive at this time.

If the tag 130 determines that no update can be received ("NO" at step 311), the tag 130 cycles back into a sleep state (step 330) without any further communication. In an alternate embodiment, the tag 130 may send a message to the gateway 120 containing an indication that no transmittal can be made (e.g., a set bit accepting/declining transmission). If an update can be received, the tag 130 responds to the gateway 120 as described below.

In another embodiment, the tag 130 may, in making its determination, consider a standard configuration of the tag 130, such as a desired power consumption threshold selected to ensure a high level of performance. This may take the form of, for example, a threshold power consumption that the tag 130 should not exceed. Such a threshold analysis may involve, for instance, calculating a total current dependent on, e.g., a total awake time/frequency of sleep intervals, and comparing that total current against a target value or a value mandated by safety, network, or performance standards. This embodiment prescribes that the tag 130 determines, based on the immediate power needs of the device, whether the tag 130 is capable of receiving any portion of a script from a gateway 120 without exceeding that threshold. If so, the tag 130 may also determine the data size (e.g., a number of data blocks) it is capable of receiving and/or the duration for which it is capable of listening for transmission.

Once it is determined that the tag 130 can receive an update at that time ("YES" in step 311), the tag 130 determines a value or parameter that is in some manner representative or indicative of the amount of data that it wishes to receive (or of a restriction on the amount of data that it wishes to receive). In one example, this tag 130 may determine a number of packets it wishes to receive. The tag then sends a response to the gateway 120 requesting that determined amount of data (Step 311). The tag 130 then begins, in step 313, to listen for data packets from the gateway 120.

An alternate embodiment may omit any dynamic determination by the tag 130, such that step 311 is not performed. In such an implementation, rather than wait for a determination by the tag 130, the gateway 120 could follow up its update request (step 307) with a predetermined number of packets, the payload of which contain a portion of the script. The tag 130, having been notified by the gateway 120 to remain awake, based on its update request (step 307), would listen for traffic from the gateway 120. In one example implementation, the tag 130 and the gateway 120 would communicate in advance to determine a standard number of packets the tag 130 is able to receive, for example only one or a few packets. This capped limit on the number of packets would be low, so as to limit the amount of time the tag 130 must spend listening for packets. Alternatively, the number of packets could be set by a network protocol, a network administrator, or by a determination made by the gateway 120 (described further below with respect to FIG. 4).

In either implementation, the tag 130, in step 313, listens for packets from the gateway 120. It will be understood that the packets contain at least a sequence number identifying the packet's sequential place in the transmission of the entire script. The payload portion of these packets make up the actual script, or, in most instances, a portion thereof. In one embodiment, the first packet to be sent contains a sequence or mapping of the packets to be received and/or the total number of packets.

Once the tag 130 receives a number of packets in conformance with its request (step 315), the control logic 225 of tag 130 performs an error check on the received packets (step 317). This may be done by a cyclic redundancy check of the sent data, or the like, wherein parity information is included in a packet, however, any known or developed error-detection system may be used. If errors exist, the tag 130 requests retransmission of the requested packets from the gateway 120. In another embodiment, the error check may not be performed by the tag 130 until it has received the entirety of the script, which would happen at the end of multiple cycles of packet transmission, as described below.

If no errors exist in the transmission from the gateway 120 (step 317) (or if the tag 130 does not perform an error check at this time), the tag 130 writes the packets to the SW database 227 of its memory 220 (or the relevant received portion of the update, stripped of its packet headers). The tag 130 thereafter stops listening for additional transmission from the gateway 120, and proceeds to transition to a sleep state (step 330). This period of time from when the tag 130 awakens (step 310) to when it returns to a sleep state (step 330) may be referred to herein as a "wake cycle".

In an alternate embodiment, rather than requesting a specified number of packets at step 311, the tag 130 transmits a determined duration of time during which the tag 130 is able to listen for transmission from the gateway 120. After the expiration of that determined period of time, the tag writes the received data to the SW database 227 of the memory 220, stops listening for additional transmission from the gateway, and proceeds to transition to a sleep state (step 330).

Yet another alternate embodiment may allow for one or more repeated transmissions of packets between the gateway 120 and the tag 130. For example, if, after receiving the script update packets in step 315, the tag 130 determines that it still has the power capacity to receive additional packets, the tag 130 may wish that the gateway 120 send additional packets. The process then cycles back to step 311, wherein the tag 130 dynamically determines how many packets it wishes to receive (or the duration of packet transmission) and provides that limitation to the gateway 120. The process then continues once again from step 313, for as many repetitions of this process as are needed. It will be noted that, instead of a dynamic decision, the number of packets in the subsequent transmission may instead by set by local or network configuration, or by a determination by the gateway 120, as described below, or any other appropriate method.

As the nature of a software update generally includes a large file, it is apparent that the entirety of the update generally would not be able to be contained in a single packet, and most likely, only a portion of the update could be received in the short amount of time before the tag 130 returned to a sleep state. It is therefore apparent that receipt of the update may need to be broken up into multiple portions, the first of which is received as described above. The remaining portions are sequentially received through subsequent iterations of the process of FIG. 3 (i.e., distributed over multiple wake cycles), as the tag 130 cycles through its normal active and inactive modes of operation.

After one complete iteration of the process described in FIG. 3, the tag 130 transitions back to an awake state (into a second wake cycle), at its normal interval of transition. At that time, the process of FIG. 3 cycles from step 330 back to step 301, and the tag 130 once again may receive a notification from the gateway 120 as to an available update, namely, the remainder of the script that gateway 120 sent a portion of during the previous iteration. The tag 130 can therefore once again make a dynamic determination of whether it can receive the next portion of the script from the gateway.

Because the tag 130 heretofore only received a portion of the script, and because extraneous redundancy in transmission would result in wasted power consumption by the tag 130, it is important that the next transmissions from the gateway 120 to the tag 130, during the tag's next active period, include only packets that the tag 130 has not yet received, and preferably, a set of packets immediately subsequent to, and contiguous with, the previously sent packets. This may be accomplished by tracking the sequence numbers of the packets already sent. In one embodiment, the gateway 120 may maintain a table associating the tag 130 with a last transmitted packet number. In another embodiment, the tag 130 may provide gateway 120, in step 311, the sequence number of the packet last received by the tag, or the next sequence number to be sent. The tag may, for example, refer to the packets stored in the software database 227 of its memory 220 to make this determination. In other embodiments, packets may be transmitted to the tag out of order, and the tag may reorder the packets as may be desired based on the sequence numbers included in the packets.

Once the tag 130 has proceeded once again through the process of FIG. 3, the tag 130 may then return, in step 330, to a sleep state, where less power is used, such that it would not exceed any power consumption threshold. The process of FIG. 3 would thereafter begin again.

The tag 130 is able to determine when the entirety of the update is received by reference to the information stored in its SW database 227, and, if available, information provided by the gateway 120 regarding the total number of packets in the update. The tag 130 compares the sequence numbers of the received packets and determines whether any packets were dropped or corrupted, and if so, may request, during its next period of activity, that the gateway 120 retransmit those particular packets.

Once the tag 130 has determined that the entirety of the update has been received without error, the tag can proceed to install the software. The timing for such installation can, in one embodiment, be scheduled based on a dynamic determination of the tag's power consumption needs, using, for example, the same factors discussed above that effect the power consumption of the tag 130. Alternatively, the update can be installed immediately after the transfer is complete, or at a scheduled time set by network standards, as is appropriate.

Figure 4:
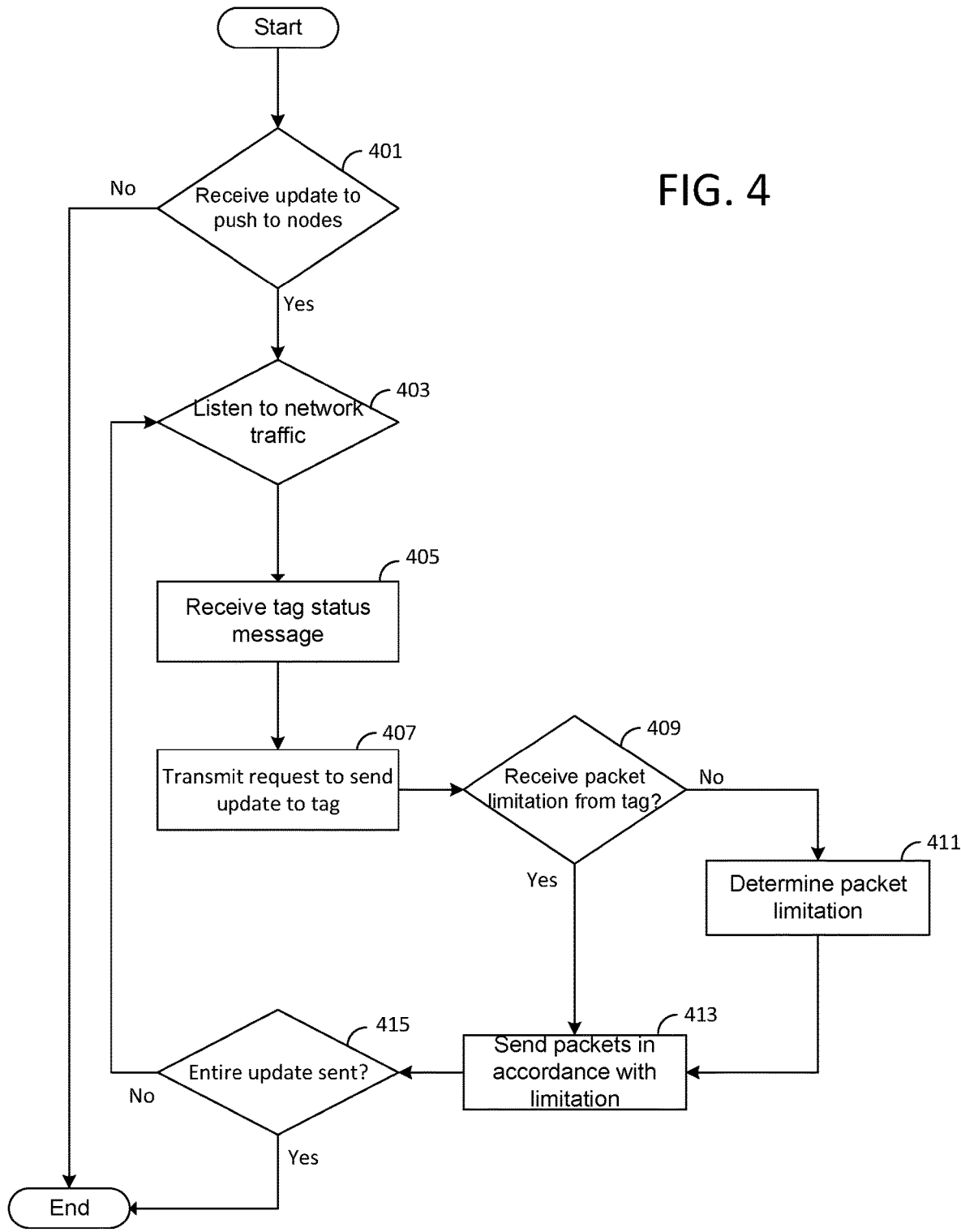
FIG. 4 is a flow chart depicting a process performed by a network node, in accordance with an exemplary embodiment of the present disclosure.

FIG. 4 illustrates a process performed by the gateway 120 in connection with providing a software update to the tag 130. The process begins in step 401, wherein the gateway 120 receives a software update from the remote server 160. In one embodiment, the remote server 160 transmits software to the gateway 120, either directly or indirectly, and instructs gateway 120 to push the software to the nodes managed by the gateway on WSN 110, including tag 130. In another embodiment, a network administrator or other network management device may instruct the gateway 120 to push the software to it managed nodes. In yet another embodiment, the gateway 120 may instructed to actively download or request the software update from a remote web server, such as a third party software provider's server.

The gateway 120, receives the software update, divides it into a series of data packets, and stores it in a memory. In an alternative embodiment, the data is stored in the memory of the gateway 120 in its entirety, and is divided into constituent packets at the time the gateway 120 intends to transmit the data. The process then continues to step 403 of FIG. 4, in which the gateway 120 listens to network traffic between the nodes of the WSN 110 and the networked devices coupled to WAN 150. This is done in accordance with the normal operation of the gateway 120.

In step 405, the gateway 120 receives a tag status message sent by tag 130, triggering an awareness at the gateway 120 that tag 130 is in an active state. The gateway may then refer to a set of information (e.g., a list, table or database) in its memory to determine whether an update for the tag 130 is available. In one example, this information may be stored in a database, where the database contains data associating the tag 130 with the its update status, for example, the last time software was pushed to the tag 130, whether the tag 130 is in compliance with network standards, and any other information that may suggest to the gateway that additional software should be transmitted and installed at the tag 130.

Thereafter, in step 407, the gateway 120 transmits a request to the tag 130 inquiring whether the update can be sent. The form of this request is as described above with respect to FIG. 3 (step 307). In a preferred embodiment, the request contains only a single packet, however, the message may contain multiple fields, e.g., informing the tag 130 that information to follow is a software update, that the content of the update is contained in the payload of the data, or instructions to record the content of the packet that follows this message, among other things. The gateway 120 then waits for a response from the tag 130.

In step 409, the gateway 120 determines whether it has received a response from the tag 130 that contains a limitation on the number of packets can be transmitted. For example, the response from the tag 130 may limit the transmission to one packet (or more), or to a duration of time during which packets can be sent. If the tag 130 is unable to receive packets, this response may indicate that the number of packets to be sent is zero, or may otherwise indicate (e.g., through the type of packet or a set bit) that no data should be sent. Other embodiments may allow for different types of limitations on transmission to be set, as appropriate. If a response that sets a limitation is received, the process continues to step 413, as described below.

If no such response with a packet limitation is received (or if a response is received that does not expressly limit the packets, for example, if the response just confirms availability), then the process may, in one embodiment, continue to step 411, in which the gateway 120 determines what limitation should be set on the transmission of the software update to tag 130. The gateway may, for example, determine this information by reference to previous transmission limitations sent by the tag 130, or by calculations based on power limitations of the tag 130, the average uptime for the tag 130, or other factors relevant to the power consumption of the tag 130, and the like. Alternatively, the gateway 120 may make such determinations based on network conditions, such as the current network traffic of the WSN 110. In yet another embodiment, the gateway 120 may select a limitation based on a standard set by network administrator, or by an industry, safety, or efficiency standard. Other embodiments may use involve the consideration of other factors.

In step 413, the gateway 120 sends a number of packets in accordance with the set limitation on transmission, whether such limitation is set by the tag 130 or by the gateway 120. The packets sent in step 413 contain at least a sequence number identifying the packet's sequential place in the transmission of the entire software update. The payload portion of these packets make up the actual script, or, in most instances, a portion thereof. In one embodiment, the first packet to be sent contains a sequence or mapping of the packets to be received and/or the total number of packets.

The gateway determines the starting number of the packets to transmit, of the multiple packets that make up the software update stored in the memory of the gateway 120. If no portion of this update has been previously sent to the tag 130, the transmission should begin with the first sequential packet. The information may be sent by the tag 130, along with its packet limitation in step 409, and may take the form of a packet sequence number at which to begin the transmission (or the last received packet sequence number), if previous portions of this software update were sent in the past. In another embodiment, the gateway 120 maintains in its memory a list of the packets previously sent to the tag 130, and may reference the sequence number of the last sent packet. The transmission in step 413 would preferably begin at the next sequential packet number after the last sent. Accordingly, the tag 130 will not receive a duplicative set of packets.

In step 415, the gateway 120 determines whether, through the transmission of step 413 and any previous transmissions, the entirety of the software update has been sent to the tag 130. In a preferred embodiment, this is determined based on whether the transmission of step 415 contains the last packet in the sequence of packets making up the update. If the entirety of the update has been sent, the gateway 120 updates the stored information in its memory to indicate such transmission, and the process ends. If the entirety of the software update has not been sent, the gateway 120 updates the stored information in its memory to reflect the packet numbers of the packets sent in the latest transmission. The process then cycles back to step 403, in which the gateway 120 continues to listen to network traffic to determine the next period in which the tag 130 is in an active state.

In one embodiment, the gateway 120 may, after cycling from step 415 to step 403, receive a request from the tag 130 to send additional packets, after having sent a series of packets in step 413. In such a case, the process skips steps 405 and 407, continuing directly to step 409 to determine whether any new limitation has been set on packet transfer, and sending the packets in step 413 in accordance thereto.

The process described above in FIGS. 3 and 4 allows for the transmission of a software update to be spread out over a long period of time, such that portions of an update are only received at a network node in conjunction with the normal operation of that node. By doing so, the periods of time during which a node is kept in an active state are minimized. Additionally, by not forcing the node to wake up outside of its normal schedule, the time and power inefficiencies of waking up, establishing a connection to a network, and any overhead related thereto, can be minimized, as such actions would already have been in connection to the scheduled task(s) of the node. Further, the power consumption of the node can be normalized and contained, such that the node does not exceed an average power consumption rate, or at any point exceed a target or predicted power consumption threshold. This reduces the possibility of unexpected or premature failure of the node's batteries or power source, and as a result, maintenance of the node's batteries or power source may be more efficiently controlled Although the overall time required to receive an update is increased, the productivity of the node is maintained throughout the entirety of the transmission of the software update, thereby maintaining a high efficiency standard for the node. Where the data provided by the node is system critical, the continued productivity of the node may improve or maintain system health.

This disclosure may be provided in other specific forms and embodiments without departing from the essential characteristics as described herein. The embodiments described are to be considered in all aspects as illustrative only and not restrictive in any manner.

Now, therefore, the following is claimed:

1. A method performed by a node of a wireless network, the node being configured to operate in recurrent wake cycles and sleep cycles, a wake cycle being the period of time from when the node enters a wake state to when the node enters a sleep state, and a sleep cycle being the period of time from when the node enters the sleep state to when the node enters the wake state, the method comprising:
    transitioning, from the sleep state to the wake state by the node, so as to begin a first wake cycle;
    determining, during the first wake cycle by the node, a first parameter for restricting an amount of software update data to be communicated to the node during the first wake cycle such that, based on the first parameter, at least a first portion of the software update data is not transmitted to the node during the first wake cycle;
    transmitting, during the first wake cycle by the node, the first parameter to a network management device via the wireless network;
    receiving, during the first wake cycle by the node, a second portion of the software update data from the network management device via the wireless network;
    transitioning from the wake state to the sleep state by the node;
    transitioning from the sleep state to the wake state by the node, so as to begin a second wake cycle after the first wake cycle; and
    receiving, during the second wake cycle by the node, the first portion of the software update data from the network management device via the wireless network.

2. The method of claim 1, further comprising:
    determining, during the second wake cycle by the node, a second parameter for restricting an amount of the software update data to be communicated to the node during the second wake cycle.

3. The method of claim 1, wherein the first parameter is determined based on at least one action performed by the node during the first wake cycle.

4. A node of a wireless network, the node configured to operate in recurrent wake cycles and sleep cycles, a wake cycle being the period of time from when the node enters a wake state to when the node enters a sleep state, and a sleep cycle being the period of time from when the node enters the sleep state to when the node enters the wake state, the node comprising at least one processor programmed with instructions that, when executed by the at least one processor, cause the at least one processor to:
    transition the node, from the sleep state to the wake state, so as to begin a first wake cycle;
    determine, during the first wake cycle, a parameter for restricting an amount of software update data to be communicated to the node during the first wake cycle such that, based on the parameter, at least a first portion of the software update data is not transmitted to the node during the first wake cycle;
    transmit, during the first wake cycle, the parameter to a network management device via the wireless network;

receive, during the first wake cycle, a second portion of the software update data from the network management device via the wireless network;

transition the node from the wake state to the sleep state;

transition the node from the sleep state to the wake state, so as to begin a second wake cycle after the first wake cycle; and receive, during the second wake cycle, the first portion of the software update data from the network management device via the wireless network.

5. A system, comprising:

a node of a wireless network configured to operate in recurrent wake cycles and sleep cycles, a wake cycle being the period of time from when the node enters a wake state to when the node enters a sleep state, and a sleep cycle being the period of time from when the node enters the sleep state to when the node enters the wake state, the node configured to (1) transition from the sleep state to the wake state, so as to begin a first wake cycle, (2) transition from the sleep state to the wake state, and (3) transition from the sleep state to the wake state, so as to begin a second wake cycle after the first wake cycle, the node further configured to determine and to transmit, during the first wake cycle, a first parameter for restricting an amount of software update data to be communicated to the node during the first wake cycle, the software update data including at least a first portion and a second portion;

a network management device configured to receive the first parameter and to select, based on the first parameter, the second portion of the software update data for transmission to the node, the network management device further configured to transmit the second portion of the software update data to the node during the first wake cycle and, based on the first parameter, to refrain from transmitting the first portion of the software update data to the node during the first wake cycle, wherein the node is further configured to determine and to transmit, during the second wake cycle, a second parameter for restricting an amount of the software update data to be communicated to the node during the second wake cycle, and wherein the network management device is further configured to receive the second parameter and to select, based on the second parameter, the first portion of the software update data for transmission to the node, the network management device further configured to transmit the first portion of the software update data to the node during the second wake cycle.

6. The system of claim 5, wherein the first parameter limits at least one of the group including: (1) a duration that the network management device may transmit the software update data to the node in the first wake cycle, (2) a size of the software update data that the network management device may transmit to the node in the first wake cycle, and (3) a number of messages carrying the software update data that the network management device may transmit to the node in the first wake cycle.

7. The method of claim 1, wherein the first parameter limits at least one of the group including: (1) a duration that the network management device may transmit the software update data to the node in the first wake cycle, (2) a size of the software update data that the network management device may transmit to the node in the first wake cycle, and (3) a number of messages carrying the software update data that the network management device may transmit to the node in the first wake cycle.

8. The method of claim 2, further comprising transmitting, during the second wake cycle by the node, the second parameter to the network management device via the wireless network.

9. A method, comprising:

operating a node of a wireless network in recurrent wake cycles and sleep cycles, a wake cycle being the period of time from when the node enters a wake state to when the node enters a sleep state, and a sleep cycle being the period of time from when the node enters the sleep state to when the node enters the wake state;

transitioning, from the sleep state to the wake state by the node, so as to begin a first wake cycle;

determining, during the first wake cycle by the node, a parameter for restricting an amount of software update data to be communicated to the node during the first wake cycle, wherein the software update data includes at least a first portion and a second portion;

transmitting, during the first wake cycle by the node, the parameter to a network management device via the wireless network;

transmitting the second portion of the software update data from the network management device in the first wake cycle;

refraining from transmitting the first portion of the software update data from the network management device to the node in the first wake cycle based on the parameter;

receiving, during the first wake cycle by the node, the second portion of the software update data from the network management device via the wireless network;

transitioning from the wake state to the sleep state by the node;

transitioning from the sleep state to the wake state by the node, so as to begin a second wake cycle after the first wake cycle;

transmitting the first portion of the software update data from the network management device in the second wake cycle; and receiving, during the second wake cycle by the node, the first portion of the software update data from the network management device via the wireless network.

10. The method of claim 9, wherein the parameter limits at least one of the group including: (1) a duration that the network management device may transmit the software update data to the node in the first wake cycle, (2) a size of the software update data that the network management device may transmit to the node in the first wake cycle, and (3) a number of messages carrying the software update data that the network management device may transmit to the node in the first wake cycle.

* * * * *